(12) United States Patent
Wu (10) Patent No.: US 7,925,233 B2
(45) Date of Patent: Apr. 12, 2011

(54) METHODS FOR HANDLING MEASUREMENT REPORTS IN A WIRELESS COMMUNICATION SYSTEM

(75) Inventor: Chih-Hsiang Wu, Tao-Yuan (TW)

(73) Assignee: HTC Corporation, Taoyuan, Taoyuan County (TW)

( * ) Notice: Subject to any disclaimer, the term of this patent is extended or adjusted under 35 U.S.C. 154(b) by 844 days.

(21) Appl. No.: 11/780,476

(22) Filed: Jul. 20, 2007

(65) Prior Publication Data

US 2009/0023436 A1    Jan. 22, 2009

(51) Int. Cl.
*H04B 17/00* (2006.01)
(52) U.S. Cl. ............... 455/226.2; 455/226.1; 455/115.1; 455/115.3; 455/436
(58) Field of Classification Search ............... 455/115.1, 455/115.3, 226.1, 226.2, 436–439, 452.2, 455/453; 370/331–333
See application file for complete search history.

(56) References Cited

U.S. PATENT DOCUMENTS

| | | | |
|---|---|---|---|
| 7,583,969 B2 * | 9/2009 | Mella et al. ................... | 455/450 |
| 2005/0157655 A1 * | 7/2005 | Funnell ......................... | 370/241 |
| 2005/0159147 A1 * | 7/2005 | Roberts et al. ................ | 455/423 |
| 2006/0166653 A1 * | 7/2006 | Xu et al. ..................... | 455/412.2 |
| 2006/0268717 A1 * | 11/2006 | Kanterakis .................... | 370/235 |

FOREIGN PATENT DOCUMENTS

| EP | 1 677 557 A1 | 7/2006 |
|---|---|---|
| WO | 2005/122605 A1 | 12/2005 |

OTHER PUBLICATIONS

"Universal Mobile Telecommunications System (UMTS); Radio Resource Control (RRC) protocol specification (3GPP TS 25.331 version 6.3.0 Release 6)", XP002330522, ISSN: 0000-0001, Sep. 1, 2004.
3GPP TS 25.331 v6.3.0 Radio Resource Control (RRC), p. 202-p. 221, Sep. 2004.

* cited by examiner

*Primary Examiner* — CongVan Tran
(74) *Attorney, Agent, or Firm* — Winston Hsu; Scott Margo (57) ABSTRACT

A method of handling measurement reports for a mobile station of a wireless communications system includes: receiving a control message from the base station, wherein the control message is configured for asking the mobile station to transit from a first state to a second state different from the first state; and blocking the mobile station from sending a measurement report to the base station before the mobile station transits to the second state.

20 Claims, 6 Drawing Sheets

METHODS FOR HANDLING MEASUREMENT REPORTS IN A WIRELESS COMMUNICATION SYSTEM

BACKGROUND OF THE INVENTION

1. Field of the Invention

The present invention relates to a wireless communication system, and more particularly, to handling of measurement reports in a wireless communication system.

2. Description of the Prior Art

Figure 1:
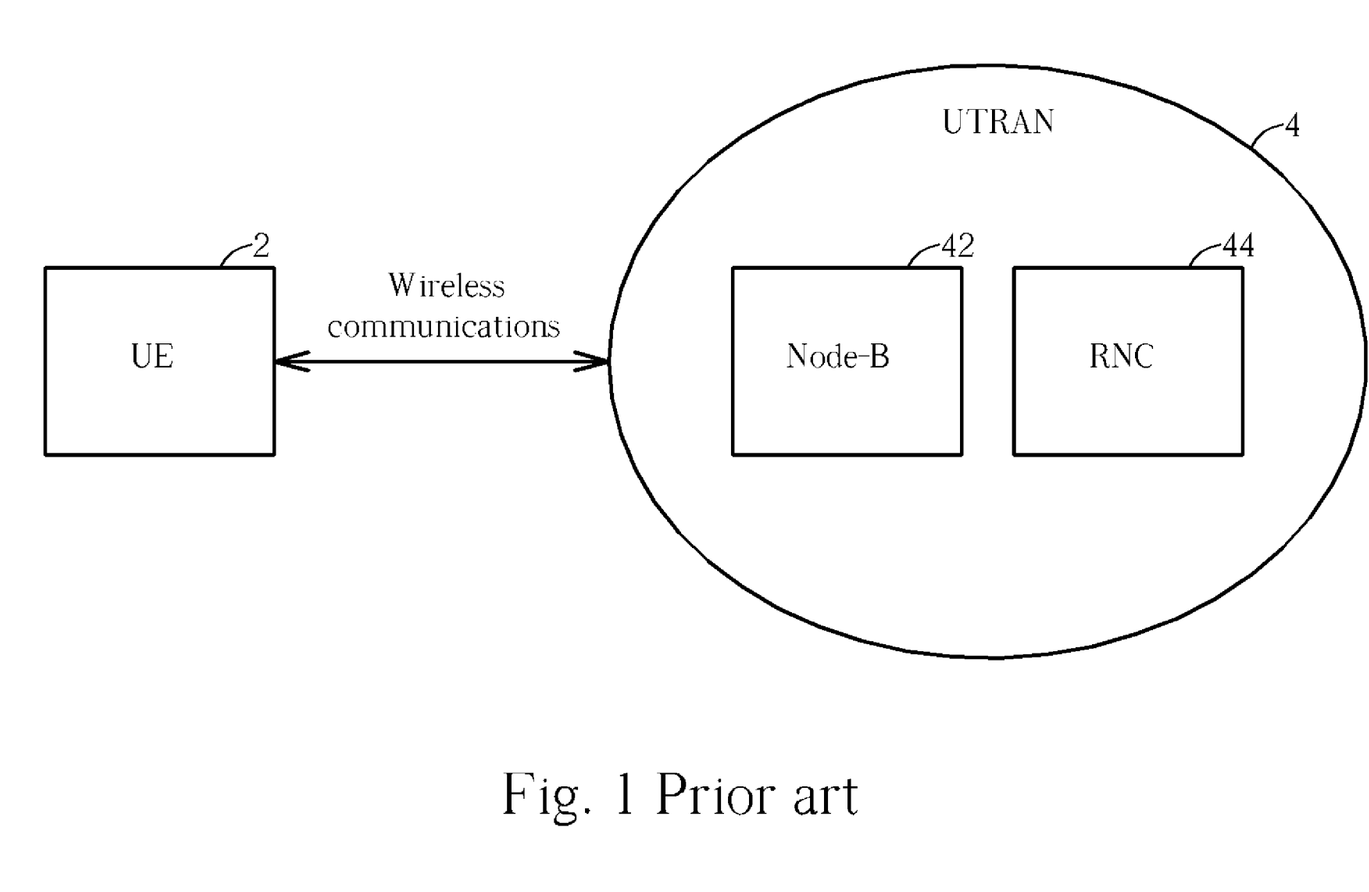
FIG. 1 is a simplified diagram illustrating a conventional universal mobile telecommunications system (UMTS) network.

Please refer to FIG. 1. FIG. 1 is a simplified diagram illustrating a conventional universal mobile telecommunications system (UMTS) network, which consists of at least one user equipment (UE) 2 and a UMTS terrestrial radio access network (UTRAN) 4. In general, the UE is equivalently the mobile station, and the UTRAN 4 comprises a base transceiver station (which is termed "node-B" 42 in UMTS) and a base station controller (which is termed "radio network controller" (RNC) 44 in UMTS).

Among the protocol layers of the UMTS, the radio resource control (RRC) layer plays an important role for wireless access. The RRC layer provides functions such as control of quality of service (QoS), information exchange between the UE and UTRAN, and configuration of radio resources. To configure the radio resources control, certain measurements are necessary. The RRC layer decides what to measure, when to measure it, and how to report the measurement results, including both over the UMTS air interface and other radio systems. It also constructs reports of the measurement results from the UE to the network. When the UE is in idle modes the measurements are usually internal to the UE. It is also possible that some of the measurement results must be reported to the network when the UE is in connected mode. The descriptions of RRC layer are defined in specification "3GPP TS 25.331 Radio Resource Control (RRC)" and hence are not repeated in detail.

Besides, there are four RRC states defined in the connected mode: CELL_DCH state, CELL_FACH state, CELL_PCH state and URA_PCH state. These states reflect the level of UE connection and the transport channels that can be used by the UE. For example, the CELL_PCH state and URA_PCH state are characterized by the fact that there is no uplink activity, while in the CELL_DCH state a dedicated physical channel is assigned; though no dedicated physical channel is allocated in the CELL_FACH state, a default common or shared transport channel is assigned. To make the UE to have an RRC state transition, the UTRAN can initiate any one of the following radio bearer control procedures, which is triggered by the UE's reception of a radio bearer control message from the UTRAN and the UE responds to the message with a corresponding radio bearer control complete message:

1. radio bearer setup procedure;
2. radio bearer reconfiguration procedure;
3. radio bearer release procedure;
4. transport channel reconfiguration procedure; and
5. physical channel reconfiguration procedure.

Upon receiving a radio link control (RLC) acknowledgement message from the UTRAN, the UE transits to a new RRC state and hence completes the RRC state transition.

To perform the measurements in connected mode, the UTRAN must first send a measurement control message to the UE. Within the measurement control message, there are several information elements (IEs) relating to what kind of measurement procedure should be performed. For example, the IE "measurement command" can have the value of "set up", "modify" or "release", and the IE "measurement type" specifies the types of measurement(s) the UTRAN wants the UE to perform. The UE measurements can be categorized into seven types as below:

1. Intra-frequency measurements;
2. Inter-frequency measurements;
3. Inter-RAT measurements;
4. UE positioning measurements;
5. Traffic volume measurements (TVM);
6. Quality measurements; and
7. UE internal measurements.

The results of the measurements are sent back to the UTRAN in measurement report messages either periodically, after some triggering event, or using a combination of the two. There is a long list of events that may trigger a measurement report, but a UE does not normally have to report all these events; there is a pool of events from which the UTRAN can choose the events to be reported. For example, the first report is sent after a triggering event, and the following messages are sent periodically, while the same triggering conditions still apply.

Figure 2:
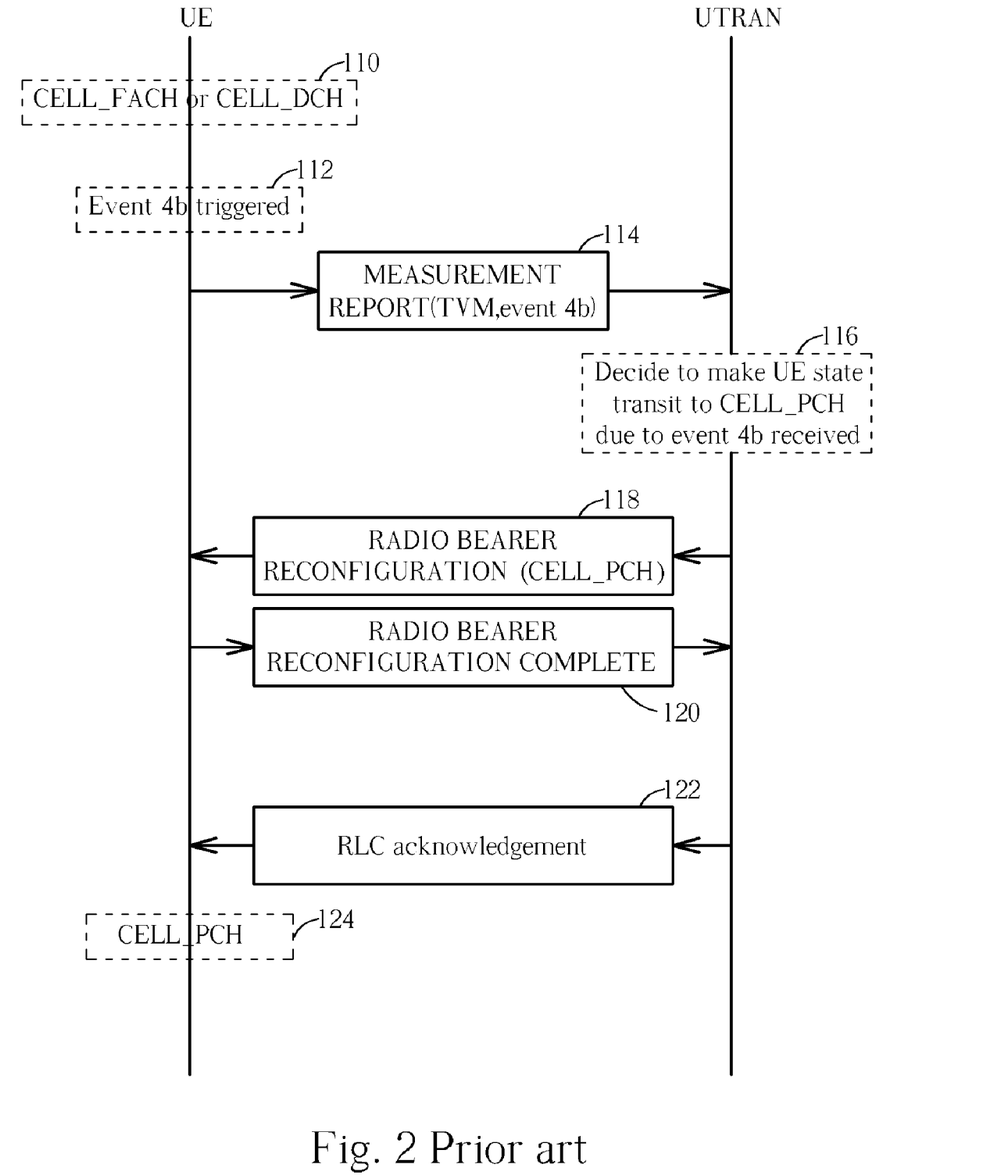
FIG. 2 illustrates a message sequence chart without another triggered event when the UE waits for an RLC acknowledgement message according to the prior art.

Please refer to FIG. 2. FIG. 2 illustrates a message sequence chart of a TVM measurement report procedure in normal condition:

Step 110: The UE is originally configured to be in the CELL_DCH state or the CELL_FACH state;

Step 112: The event 4b of the measurement type of "traffic volume" measurement is triggered;

Step 114: The UE sends a measurement report message (MEASUREMENT REPORT message in 3G specification is sent in this example) to the UTRAN;

Step 116: The UTRAN determines to make the UE enter a different state such as the CELL_FACH state (when the UE is originally in CELL_DCH state), the CELL_PCH state or the URA_PCH state (in this example, the CELL_PCH state is entered);

Step 118: The UE receives a radio bearer control message from the UTRAN (RADIO BEARER RECONFIGURATION message in 3G specification is sent in this example);

Step 120: The UE transmits a corresponding radio bearer control complete message to the UTRAN (RADIO BEARER RECONFIGURATION COMPLETE message in 3G specification is sent in this example);

Step 122: The UTRAN sends an RLC acknowledgement to confirm the reception of the radio bearer control complete message from the UE; and Step 124: The UE enters a new RRC state due to the radio bearer control message in Step 118 (in this scenario, the CELL_PCH state is entered).

There may be various reasons prompting the UTRAN to command the UE to enter CELL_FACH state, CELL_PCH state or URA_PCH state. According to this example, the UE sends a measurement report message in Step 114 notifying the UTRAN of the event 4b, which indicates that transport channel traffic volume becomes smaller than an absolute threshold. In other words, the UE has no more data to be sent in the uplink channel, and it can be readily appreciated that the UTRAN is allowed to make the UE enter the CELL_FACH, CELL_PCH state or the URA_PCH state. As described above, the UTRAN hence initiates the radio reconfiguration procedure by sending a RADIO BEARER RECONFIGURATION message in Step 118, and the UE responds with a RADIO BEARER RECONFIGURATION COMPLETE message in Step 120. After receiving an RLC acknowledgement message from the UTRAN, the UE enters a new RRC state, as shown in Step 122 and 124.

Figure 3:
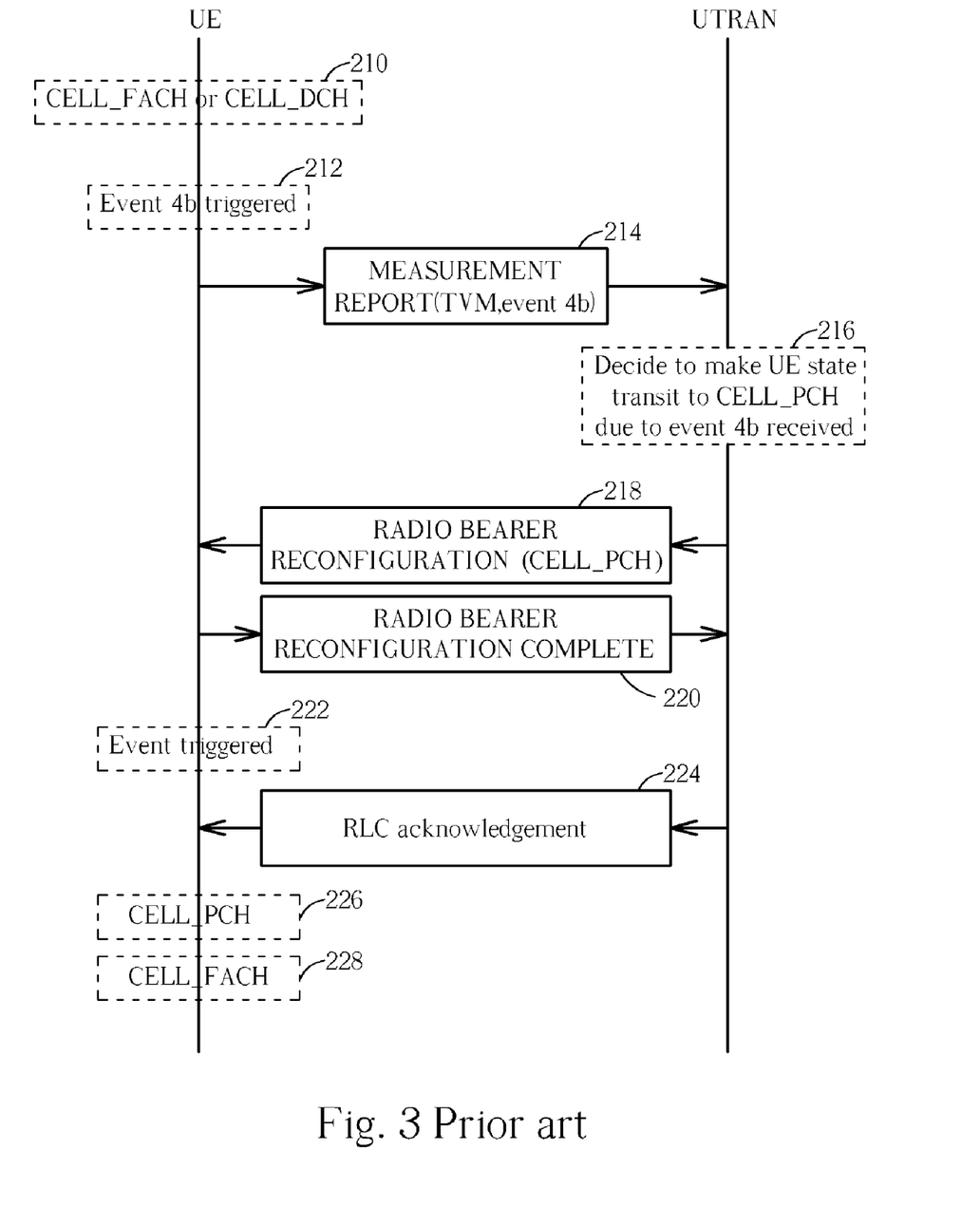
FIG. 3 illustrates a message sequence chart with another triggered event when the UE waits for an RLC acknowledgement message according to the prior art.

However, some measurement reports are unnecessary under certain scenarios. Please refer to FIG. 3. FIG. 3 illustrates one scenario in which some problems could occur:

Step 210: The UE is originally configured to be in the CELL_DCH state or the CELL_FACH state;

Step 212: The event 4b of the measurement type of "traffic volume" measurement is triggered;

Step 214: The UE sends a measurement report message (MEASUREMENT REPORT message in 3G specification is sent in this example) to the UTRAN;

Step 216: The UTRAN determines to make the UE enter a different state such as the CELL_FACH state (when the UE is originally in CELL_DCH state), the CELL_PCH state or the URA_PCH state (in this scenario, the CELL_PCH state is entered);

Step 218: The UE receives a radio bearer control message from the UTRAN (RADIO BEARER RECONFIGURATION message in 3G specification is sent in this example);

Step 220: The UE transmits a corresponding radio bearer control complete message to the UTRAN (RADIO BEARER RECONFIGURATION COMPLETE message in 3G specification is sent in this example);

Step 222: Another event is triggered;

Step 224: The UTRAN sends a radio link control (RLC) acknowledgement to confirm the reception of the radio bearer control complete message from the UE;

Step 226: The UE enters a new RRC state due to the radio bearer control message in Step 218 (in this scenario, the CELL_PCH state is entered); and Step 228: The UE enters CELL_FACH state because a measurement report must be sent due to Step 222;

Within this scenario, an event occurred between a RADIO BEARER RECONFIGURATION COMPLETE message sent in Step 218 and an RLC acknowledgement message sent in Step 220. That is possible because there could be a time interval, say 150 ms, between Steps 218 and 220. If any event is triggered during this time interval, the UE needs to enter CELL_FACH state immediately to send the corresponding measurement report. Since the UTRAN has commanded the UE enter the CELL_PCH state, as shown in Step 216, the UE is not supposed to have any uplink activity. Therefore, this measurement report becomes unnecessary. These unnecessary measurement reports may have the measurement type of traffic volume (the event 4b is triggered), intra-frequency, inter-frequency, inter-RAT, quality, or UE internal measurement. This not only wastes the UTRAN resource due to CELL_FACH reconfiguration but also consumes UE power due to unnecessary measurement transmission in CELL_FACH state.

SUMMARY OF THE INVENTION

It is therefore one of the objectives of the claimed invention to provide methods of handling measurement reports in a wireless communication system to solve the above-mentioned problems.

According to one embodiment of the claimed invention, a method of handling measurement reports in a wireless communication system is disclosed. The method comprises: receiving a control message configured for asking the mobile station to transit from a first state to a second state different from the first state; and blocking the mobile station from sending a measurement report before the mobile station transits to the second state.

According to the second embodiment of the claimed invention, a method of handling measurement reports in a wireless communication system is disclosed. The method comprises: receiving a control message, wherein the control message is configured for asking the mobile station to transit from a first state to a second state different from the first state; blocking the mobile station from performing measurement for a measurement report before the mobile station transits to the second state.

According to the third embodiment of the claimed invention, a method of handling measurement reports in a wireless communication system is disclosed. The method comprises: determining whether a control message needs to be sent in response to a measure report, wherein the control message is used to transit the mobile station transit from a first state to a second state; and when the control message needs to be sent, sending a measurement control message to the mobile station for releasing a measurement procedure running on the mobile station.

These and other objectives of the present invention will no doubt become obvious to those of ordinary skill in the art after reading the following detailed description of the preferred embodiment that is illustrated in the various figures and drawings.

DETAILED DESCRIPTION

Figure 4:
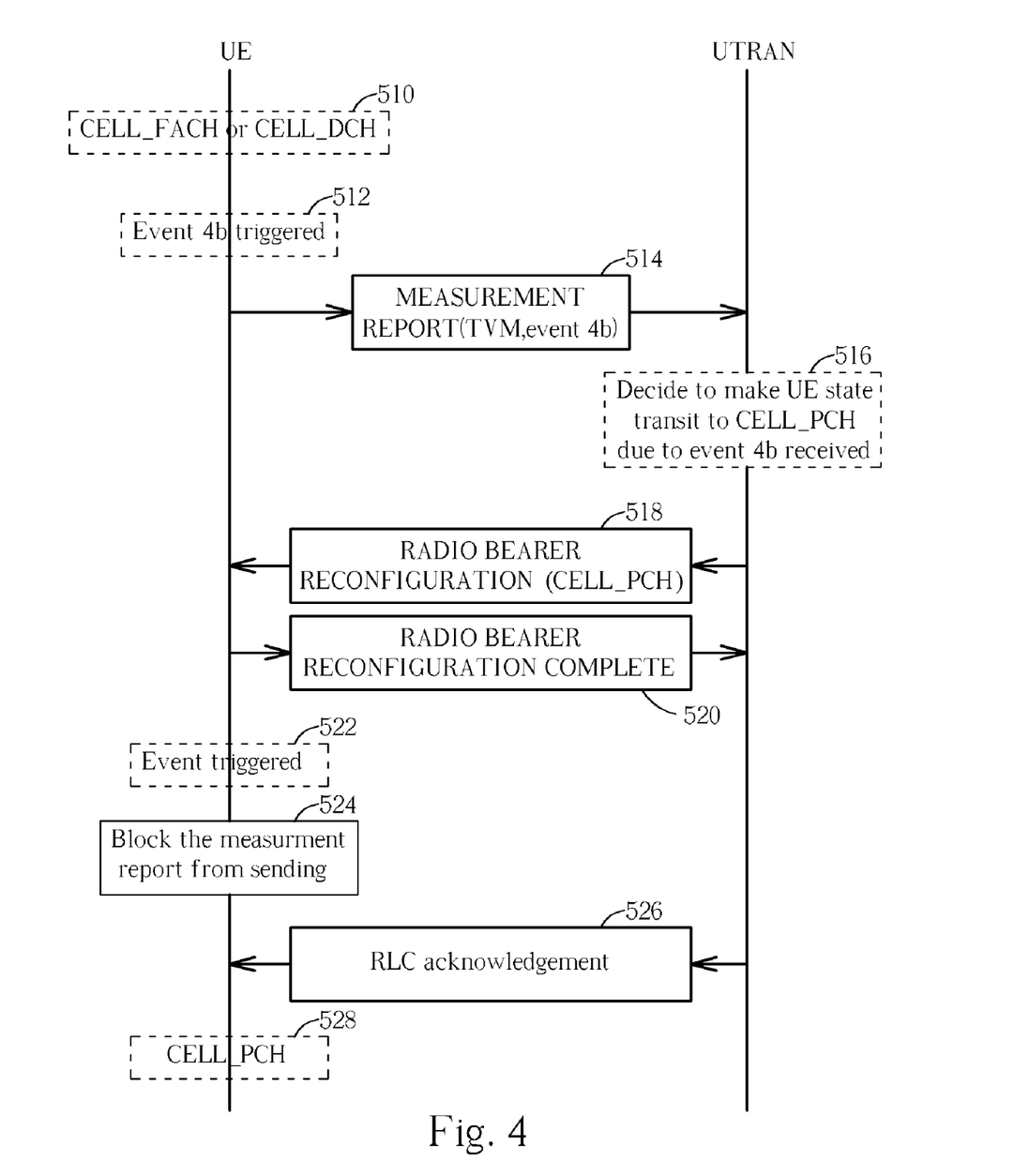
FIG. 4 illustrates a message sequence chart according to a first embodiment of the present invention.

Please refer to FIG. 4. FIG. 4 illustrates a message sequence chart between the UE and the UTRAN mentioned above according to a first embodiment of the present invention. The steps of the message sequence chart are briefly summarized as below:

Step 510: The UE is originally configured to be in the CELL_DCH state or the CELL_FACH state;

Step 512: The event 4b of the measurement type of traffic volume measurement is triggered;

Step 514: The UE sends a measurement report message (MEASUREMENT REPORT message in 3G specification is sent in this example) to the UTRAN;

Step 516: The UTRAN determines to make the UE enter a different state such as the CELL_FACH state (when the UE is originally in CELL_DCH state), the CELL_PCH state or the URA_PCH state (in this exemplary embodiment, the CELL_PCH state is entered);

Step 518: The UE receives a radio bearer control message from the UTRAN (in this exemplary embodiment, a RADIO BEARER RECONFIGURATION message in 3G specification is sent);

Step 520: The UE transmits a corresponding radio bearer control complete message to the UTRAN (in this exemplary embodiment, a RADIO BEARER RECONFIGURATION COMPLETE message in 3G specification is sent);

Step 522: Another event is triggered;

Step 524: The UE blocks its measurement report from being sent to the UTRAN when the measurement report criterion of the UE is fulfilled;

Step 526: The UTRAN sends an RLC acknowledgement to confirm the reception of the radio bearer control complete message from the UE; and Step 528: The UE enters a new RRC state due to the radio bearer control message in Step 518 (in this exemplary embodiment, the CELL_PCH state is entered).

Provided the result is substantially the same, the steps shown in the message sequence chart are not limited to be executed according to the exact order shown in FIG. 4. Additionally, only the steps pertinent to the present invention are shown in the message sequence chart of FIG. 4 for clarity and simplicity.

As described in Step 516, the UTRAN decides to make the UE transit to a new RRC state such as CELL_PCH state in FIG. 4 because the event 4b of the measurement type of traffic volume measurement is triggered in the UE. However, the present invention should also be applied to any situation that the UTRAN is allowed to make the UE enter a new RRC state such as CELL_FACH state, CELL_PCH state or URA_PCH state.

In this embodiment, the measurement report criterion can be periodic or event triggered, depending upon design requirements. According to the present invention, the measurement types and its associated event-triggered measurement report criterion that should be blocked from sending if the UE is commanded to enter a new RRC states mentioned above comprise:

1. Traffic volume measurement and its associated measurement report criteria event 4b indicating that transport channel traffic volume becomes smaller than an absolute threshold;

2. Intra-frequency measurement and all of its associated measurement report criterion events;

3. Inter-frequency measurement and all of its associated measurement report criterion events;

4. Inter-RAT measurement and all of its associated measurement report criterion events;

5. Quality measurement and all of its associated measurement report criterion events; and 6. UE internal measurement and all of its associated measurement report criterion events.

In the above exemplary embodiment, the UE receives a radio bearer control message (i.e., a RADIO BEARER RECONFIGURATION message in 3G specification) from the base station of the UTRAN for asking the mobile station to transit from a first state (e.g., the CELL_DCH state or the CELL_FACH state) to a second state (e.g., the CELL_FACH state (when the UE is originally in CELL_DCH state), the CELL_PCH state, or the URA_PCH state) where the first state is different from the second state. The UE then transmits a radio bearer control complete message (e.g., a RADIO BEARER RECONFIGURATION COMPLETE message in 3G specification) to the base station of the UTRAN in response to the control message. Next, the UE waits for an acknowledgement message (e.g., an RLC acknowledgement message) from the base station, and also avoids sending the measurement report before the acknowledgement message is received. In other words, even though the measurement is performed to prepare the measurement report, sending of the measurement report is blocked in the UE while waiting for the acknowledgement message from the base station of UTRAN. In this way, the UE will not enter the CELL_FACH state for any unnecessary measurement reporting listed above when the UE is allowed to enter, for example, the CELL_PCH state.

Through these modifications, this exemplary embodiment can prevent the UE from sending unnecessary measurement reports and therefore provide a power-efficient way to manage the measurement reports in this scenario.

Figure 5:
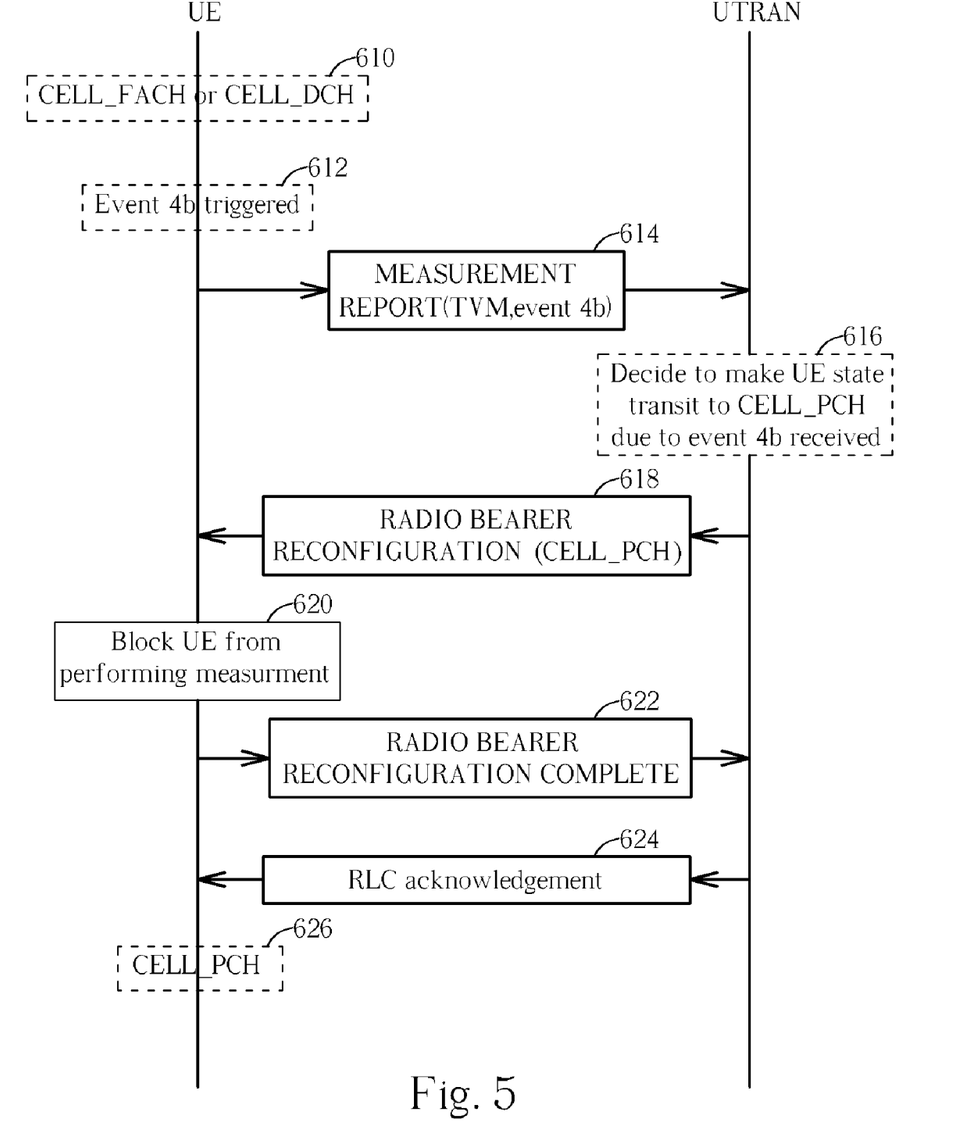
FIG. 5 illustrates a message sequence chart according to a second embodiment of the present invention.

Please refer to FIG. 5. FIG. 5 illustrates a message sequence chart between the UE and the UTRAN mentioned above according to a second embodiment of the present invention. The steps of the message sequence chart are briefly summarized as below:

Step 610: The UE is originally configured to be in the CELL_DCH state or the CELL_FACH state;

Step 612: The event 4b of the measurement type of traffic volume measurement is triggered;

Step 614: The UE sends a measurement report message (MEASUREMENT REPORT message in 3G specification is sent in this example) to the UTRAN;

Step 616: The UTRAN determines to make the UE enter a different state such as the CELL_FACH state (when the UE is originally in CELL_DCH state), the CELL_PCH state or the URA_PCH state (in this figure, the CELL_PCH state is entered);

Step 618: The UE receives a radio bearer control message from the UTRAN (in this exemplary embodiment, a RADIO BEARER RECONFIGURATION message in 3G specification is sent);

Step 620: The UE blocks itself from performing the measurement for a measurement report before entering the new RRC state successfully;

Step 622: The UE transmits a corresponding radio bearer control complete message to the UTRAN (in this exemplary embodiment, a RADIO BEARER RECONFIGURATION COMPLETE in 3G specification message is sent);

Step 624: The UTRAN sends an RLC acknowledgement to confirm the reception of the radio bearer control complete message from the UE; and Step 626: The UE enters a new RRC state due to the radio bearer control message in Step 618 (in this exemplary embodiment, the CELL_PCH state is entered).

Provided the result is substantially the same, the steps shown in the message sequence chart are not limited to be executed according to the exact order shown in FIG. 5. Additionally, only the steps pertinent to the present invention are shown in the message sequence chart of FIG. 5 for clarity and simplicity.

As described in Step 616, the UTRAN decides to make the UE transit to a new RRC state such as CELL_PCH state in FIG. 5 because the event 4b of the measurement type of traffic volume measurement is triggered in the UE. However, the present invention should also be applied to any situation that the UTRAN is allowed to make the UE enter a new RRC state such as CELL_FACH state (when the UE is originally in CELL_DCH state), CELL_PCH state or URA_PCH state. Additionally, the measurement type that should be blocked from performing can be traffic volume measurement, intra-frequency measurement, inter-frequency measurement, inter-RAT measurement, quality measurement or UE internal measurement.

In this exemplary embodiment, the UE receives a radio bearer control message (e.g., a RADIO BEARER RECONFIGURATION message in 3G specification) from the base station of UTRAN for asking the UE to transit from a first state (e.g., the CELL_DCH state or the CELL_FACH state) to a second state (e.g., the CELL_FACH state (when the first state is CELL_DCH), the CELL_PCH state or the URA_PCH state) where the first state is different from the second state. The UE is then configured to block itself from performing the measurement for a measurement report before the UE enters the second state successfully, thereby avoiding entering the CELL_FACH state for any unnecessary measurement reporting listed above when the UE is allowed to enter, for example, CELL_PCH state. Through these modifications, this exemplary embodiment can prevent the UE from sending unnecessary measurement reports and therefore, provide a power-efficient way to manage the measurement reports in this scenario.

Figure 6:
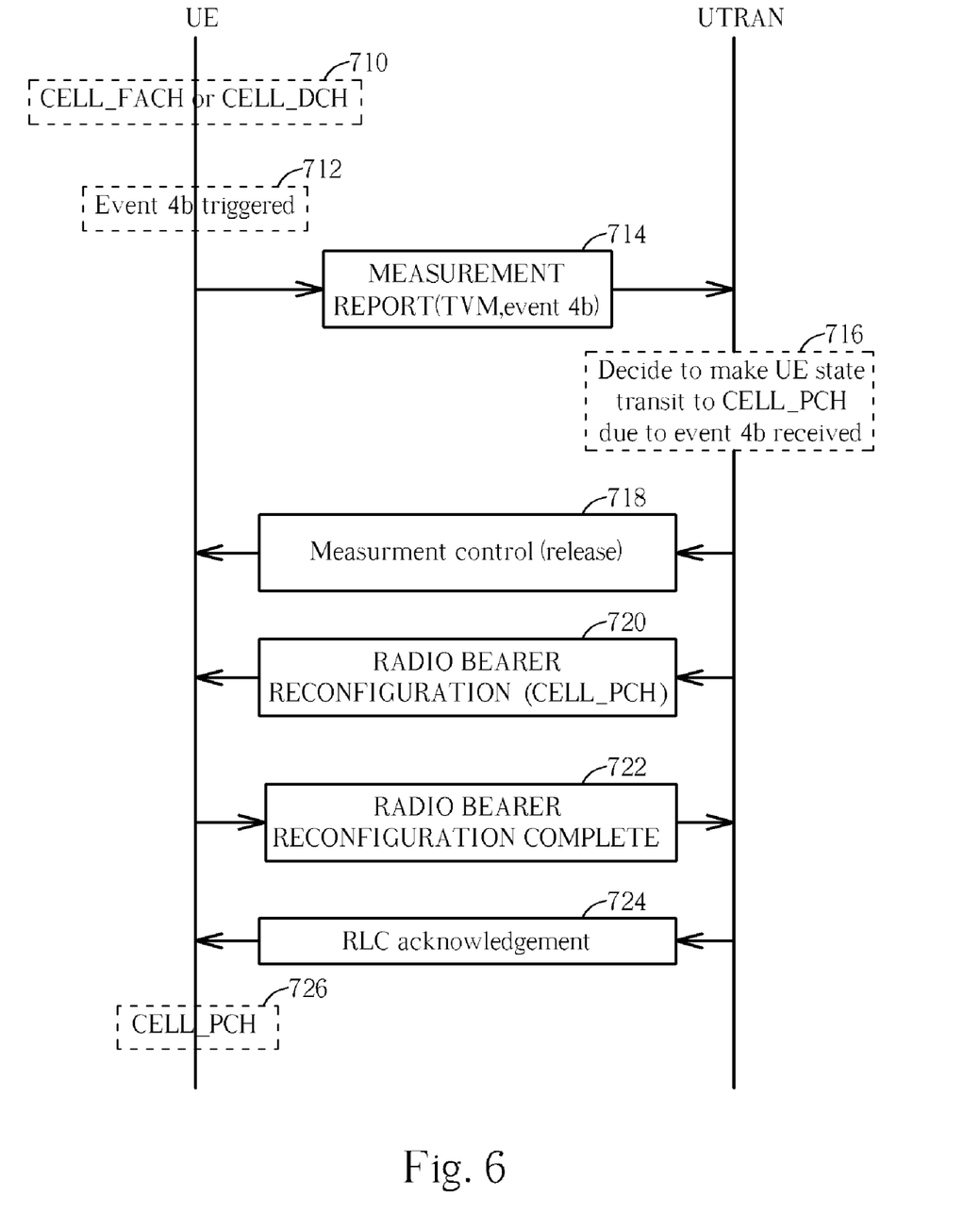
FIG. 6 illustrates a message sequence chart according to a third embodiment of the present invention.

Instead of the UE's blocking from sending measurement report or performing measurement as shown in FIG. 4 and FIG. 5, FIG. 6 illustrates an alternative way to solve the above-mentioned problem according to a third embodiment of the present invention. The steps of the message sequence chart are briefly summarized as below:

Step 710: The UE is originally configured to be in the CELL_DCH state or the CELL_FACH state;

Step 712: The event 4b of the measurement type of traffic volume measurement is triggered;

Step 714: The UE sends a measurement report message (MEASUREMENT REPORT message in 3G specification is sent in this example) to the UTRAN;

Step 716: The UTRAN determines to make the UE enter a different state such as the CELL_FACH state (when the UE is originally in CELL_DCH state), the CELL_PCH state or the URA_PCH state (in this figure, the CELL_PCH state is entered);

Step 718: The UTRAN sends a measurement control message with its associated "measurement command" being set as "release" to make the UE release the above-mentioned measurement type where the corresponding measurement report is not necessary (i.e., the measurement type of traffic volume, intra-frequency, inter-frequency, inter-RAT, quality or UE internal).

Step 720: The UE receives a radio bearer control message from the UTRAN (in this exemplary embodiment, a RADIO BEARER RECONFIGURATION message in 3G specification is sent);

Step 722: The UE transmits a corresponding radio bearer control complete message to the UTRAN (in this exemplary embodiment, a RADIO BEARER RECONFIGURATION COMPLETE message in 3G specification is sent);

Step 724: The UTRAN sends an RLC acknowledgement to confirm the reception of the radio bearer control complete message from the UE; and Step 726: The UE enters a new RRC state due to the radio bearer control message in Step 720 (in this exemplary embodiment, the CELL_PCH state is entered).

As described in Step 716, the UTRAN decides to make the UE transit to a new RRC state such as CELL_PCH state in FIG. 6 because the event 4b of the measurement type of traffic volume measurement is triggered in the UE. However, the present invention should also be applied to any situation that the UTRAN is allowed to make the UE enter a new RRC state such as CELL_FACH state (when the UE is originally in CELL_DCH state), CELL_PCH state or URA_PCH state.

In another embodiment, the measurement report may be made in the UTRAN rather than be sent from the UE. For example, the UTRAN may monitors the traffic volume of the UE, and then made the measurement report when the traffic volume of the UE is low for a predetermined time interval. The UTRAN also can decide to make the UE transit to a new RRC state such as CELL_PCH state according to the measurement report mentioned in this embodiment.

Provided the result is substantially the same, the steps shown in the message sequence chart are not limited to be executed according to the exact order shown in FIG. 6. Additionally, only the steps pertinent to the present invention are shown in the message sequence chart of FIG. 6 for clarity and simplicity.

In this exemplary embodiment, the base station of UTRAN is configured to monitor if the UE is allowed to transit from a first state (e.g., the CELL_DCH state or the CELL_FACH state) to a second state (e.g., the CELL_FACH state (when the first state is CELL_DCH state), the CELL_PCH state or the URA_PCH state) where the first state is different from the second state. When the UE is allowed to enter the second state (for example, when the UE has no data to be sent), the base station of UTRAN sends a measurement control message to the UE for releasing a measurement procedure running on the UE. In this way, the UE will not enter the CELL_FACH state for unnecessary measurement reporting when the UE is allowed to enter, for example, the CELL_PCH state. Through these modifications, this exemplary embodiment can prevent the UE from sending unnecessary measurement reports and therefore provide a power-efficient way to manage the measurement reports in this scenario.

It should be noted that, in the above exemplary embodiments, the measurement report handling scheme is applied to a 3G communication system; however, this is for illustrative purposes only and not meant to be a limitation of the present invention. In other words, without departing from spirit of the present invention, the disclosed measurement report handling scheme can be applied to any communication systems in need of improved measurement reporting control.

Those skilled in the art will readily observe that numerous modifications and alterations of the device and method may be made while retaining the teachings of the invention.

What is claimed is:

1. A method of handling measurement reports for a mobile station of a wireless communications system, the method comprising:
   receiving a control message configured for asking the mobile station to transit from a first state to a second state different from the first state; and
   blocking the mobile station from sending a measurement report before the mobile station transits to the second state in response to the control message;
   wherein the measurement report is used for an intra-frequency measurement, an inter-frequency measurement, an inter-RAT measurement, a quality measurement, or a UE internal measurement.

2. The method of claim 1, wherein the wireless communications system is a universal mobile telecommunications system (UMTS) complying with a 3G specification, and the control message is a radio bearer control message in the 3G specification.

3. The method of claim 1 further comprises transmitting a control complete message in response to the control message.

4. The method of claim 3, wherein the wireless communications system is a universal mobile telecommunications system (UMTS) complying with a 3G specification, and the control complete message is a radio bearer control complete message in the 3G specification.

5. The method of claim 2, wherein when the first state is a CELL_DCH state, the second state is a CELL_FACH state, a CELL_PCH state, or a URA_PCH state, and when the first state is the CELL_FACH state, the second state is the CELL_PCH state or the URA_PCH state.

6. The method of claim 2, wherein a measurement type of the measurement report generated by the mobile station is a traffic volume measurement.

7. The method of claim 6, wherein the measurement report is an event-triggered report.

8. The method of claim 6, wherein the measurement report is a periodic report.

9. A method of handling measurement reports for a mobile station of a wireless communications system, the method comprising:

receiving a control message, wherein the control message is configured for asking the mobile station to transit from a first state to a second state different from the first state; and blocking the mobile station from performing a measurement for a measurement report before the mobile station transits to the second state in response to the control message.

10. The method of claim 9, wherein the wireless communications system is a universal mobile telecommunications system (UMTS) complying with a 3G specification, and the control message is a radio bearer control message in the 3G specification.

11. The method of claim 9 further comprises transmitting a control complete message in response to the control message.

12. The method of claim 11, wherein the wireless communications system is a universal mobile telecommunications system (UMTS) complying with a 3G specification, and the control complete message is a radio bearer control complete message in the 3G specification.

13. The method of claim 10, wherein when the first state is a CELL_DCH state, the second state is a CELL_FACH state, a CELL_PCH state, or a URA_PCH state, and when the first state is the CELL_FACH state, the second state is the CELL_PCH state or the URA_PCH state.

14. The method of claim 10, wherein a measurement type of the measurement report is a traffic volume measurement, an intra-frequency measurement, an inter-frequency measurement, an inter-RAT measurement, a quality measurement, or a UE internal measurement.

15. A method of handling measurement reports for a base station of a wireless communications system, the method comprising:

determining whether a control message needs to be sent in response to a measurement report, wherein the control message is used to transit a mobile station from a first state to a second state; and when the control message needs to be sent, sending a measurement control message to the mobile station for releasing an operation of performing a measurement procedure running on the mobile station.

16. The method of claim 15, wherein the measurement report is sent from the mobile station or made in the base station.

17. The method of claim 15, wherein the wireless communications system is a universal mobile telecommunications system (UMTS) complying with a 3G specification, and the control message is a radio bearer control message in the 3G specification.

18. The method of claim 15 further comprises sending the control message after the measurement control message is sent.

19. The method of claim 17, wherein when the first state is a CELL_DCH state, the second state is a CELL_FACH state, a CELL_PCH state, or a URA_PCH state, and when the first state is the CELL_FACH state, the second state is the CELL_PCH state or the URA_PCH state.

20. The method of claim 17, wherein the measurement report is made from a traffic volume measurement, an intra-frequency measurement, an inter-frequency measurement, an inter-RAT measurement, a quality measurement, or a UE internal measurement.

* * * * *